(12) United States Patent
Ishizuka

(10) Patent No.: US 8,418,189 B2
(45) Date of Patent: Apr. 9, 2013

(54) SWITCHING AMONG APPLICATIONS ACCORDING TO DATE-AND-TIME OF SCHEDULE ITEM

(75) Inventor: Hiroaki Ishizuka, Ridgewood, NJ (US)

(73) Assignees: Ricoh Company, Ltd., Tokyo (JP); Ricoh Americas Corporation, West Caldwell, NJ (US)

( * ) Notice: Subject to any disclaimer, the term of this patent is extended or adjusted under 35 U.S.C. 154(b) by 1044 days.

(21) Appl. No.: 12/413,707

(22) Filed: Mar. 30, 2009

(65) Prior Publication Data
US 2010/0250999 A1 Sep. 30, 2010

(51) Int. Cl.
G06F 9/00 (2006.01)
(52) U.S. Cl. .......................................... 718/107; 718/102
(58) Field of Classification Search .......................... None
See application file for complete search history.

(56) References Cited

U.S. PATENT DOCUMENTS

| | | | |
|---|---|---|---|
| 7,050,986 B1 * | 5/2006 | Vance et al. ........................ | 705/5 |
| 7,228,313 B1 * | 6/2007 | Hand et al. .............................. | 1/1 |
| 7,346,526 B2 * | 3/2008 | Daughtrey et al. ............... | 705/5 |
| 8,215,546 B2 * | 7/2012 | Lin et al. ........................ | 235/382 |
| 2002/0143858 A1 * | 10/2002 | Teague et al. ................. | 709/203 |
| 2005/0015316 A1 * | 1/2005 | Salluzzo ......................... | 705/30 |
| 2006/0206363 A1 * | 9/2006 | Gove ................................ | 705/6 |
| 2006/0277079 A1 * | 12/2006 | Gilligan et al. .................... | 705/6 |
| 2007/0136228 A1 * | 6/2007 | Petersen .......................... | 707/1 |
| 2007/0225830 A1 * | 9/2007 | Shimura et al. ................. | 700/16 |
| 2008/0097799 A1 * | 4/2008 | Scribner ........................... | 705/5 |
| 2008/0319808 A1 * | 12/2008 | Wofford et al. ................... | 705/6 |

* cited by examiner

*Primary Examiner* — Eric Coleman
(74) *Attorney, Agent, or Firm* — Cooper & Dunham LLP

(57) ABSTRACT

An approach for switching from one application to another, according to time information of a schedule item with respect to a current date and time and including converting data of the first application to data suitable for use in the other application, is provided. Such other application is chosen based on a comparison between the time information of the schedule item and the current date and time, and the data of the first application is automatically converted to data suitable for use in the other application and transferred to the other application.

20 Claims, 13 Drawing Sheets

Fig. 5

| Management Server | | Scheduler | | | Application (trip planning/reservation) | | | Application (expense report) | | |
|---|---|---|---|---|---|---|---|---|---|---|
| ID | Password | Template | Product or Service | ID | Password | Product or Service | ID | Password | Product or Service | ID | Password |
| Hero Ishizuka | xxxxx | Sales | Notes | H.Ishizuka | abcdx | Outtask | Hero_Ishi | klmn | ExpensAble | Ishizuka_H | 1234 |
| ... | | | | | | | | | | | |
| Kaz Hanada | yyyyy | Finance | Outlook | K.Hanada | vwxya | BookIt | Kaz_Hana | uytr | ExpensePoint | Hanada_K | 6789 |
| | | | | | | | | | | | |

Traveler: Hiroaki Ishizuka
Company: Ricoh Americas Corporation

Itinerary

| Item | Date | Detail |
|---|---|---|
| Air1 | Sep 22 | Departing: New York/ Kennedy (JFK)<br>Destination: Salt Lake City (SLC)<br>Departure Time: 9:00 am, Air Line: Delta/www.delta.com<br>Flight #: 737, Confirmation #: Ptb7px |
| Air2 | Sep 22 | Departing: Salt Lake City (SLC)<br>Destination: San Francisco (SFO)<br>Departure Time: 12:25 pm , Air Line: Delta /www.delta.com<br>Flight #: 3909, Confirmation #: Ptb7px |
| Car | Pick Up: Sep 22<br>Return: Sep 24 | Place: San Francisco Int. Airport<br>Pick-Up time: 4:01pm, Rental Company: Hertz<br>Confirmation #: E12515716A2 |
| Hotel | Check-In: Sep 22<br>(after 3 p.m.)<br>Check-Out: Sep 24<br>(before 11 a.m.) | Hotel: Hilton Garden Inn<br>Address: 12345 North Wolfe Road, CA 95014<br>Confirmation #: 332089654 |
| Air3 | Sep 24 | Departing: San Francisco (SFO)<br>Destination: New York/ Kennedy (JFK)<br>Departure Time: 9:45 pm , Air Line: Delta /www.delta.com<br>Flight #: 618, Confirmation #: Ptb7px |

Table of Itinerary Items

| Itinerary # | Items |
|---|---|
| 0001 | Air1, Air2, Car1, Hotel1, Air3 |

Fig. 9

Table of Air

| Itinerary # | Date | Departing | Destination | Departure Time | Airline URL | Flight # | Confirmation # |
|---|---|---|---|---|---|---|---|
| 0001 | Sep 22 | New York/ Kennedy (JFK) | Salt Lake City (SLC) | 9:00 am | Delta/ www.delta.com | 737 | Ptb7px |
| 0001 | Sep 22 | Salt Lake City (SLC) | San Francisco (SFO) | 12:25 pm | Delta/ www.delta.com | 3909 | Ptb7px |
| 0001 | Sep 24 | San Francisco (SFO) | New York/ Kennedy (JFK) | 9:45 pm | Delta/ www.delta.com | 618 | Ptb7px |
| 0002 | | | | | | | |

Fig. 10

Table of Car

| Itinerary # | Pick Up | Return | Place | Pick Up Time | Rental Company | Confirmation # |
|---|---|---|---|---|---|---|
| 0001 | Sep 22 | Sep 24 | San Francisco Int Airport | 4:01 pm | Hertz | E12515716A2 |
| | | | | | | |

Fig. 11

Table of Hotel

| Itinerary # | Check-in | Check-out | Hotel | Address | Confirmation # |
|---|---|---|---|---|---|
| 0001 | Sep 22 | Sep 24 | Hilton Garden Inn | 12345 North Wolfe Road, CA 95014 | 3320896546 |
| 0002 | | | | | |

Fig. 12A

Conversion Table 1

| Expense Type (Application C) | Corresponding Option (Application A) |
|---|---|
| Airfare | N/A |
| Taxi | N/A |
| Car Rental | Car |
| Limo | N/A |
| Lodging | Hotel |
| Parking/Tolls | N/A |
| Travel - Airfare Company Bill | Air |
| Travel - Meals | N/A |

Fig. 12B

Conversion Table 2

| Item (Application A) | Air | Car | Hotel |
|---|---|---|---|
| Date | Date | Pick Up | Check-in |
| Justification | Airline + Flight # | Rental Company | Hotel |

Example of UI of Application C

| Line | Date | Receipt Amount | Expense Type | | Justification |
|---|---|---|---|---|---|
| 1 | 22-Sep-2008 | | Travel - Airfare Company Bill | ˅ | Delta#1275 |
| 2 | 22-Sep-2008 | | Travel - Airfare Company Bill | ˅ | Delta#3909 |
| 13 | 22-Sep-2008 | | Car Rental | ˅ | Hertz |
| 4 | 22-Sep-2008 | | Lodging | ˅ | Hilton Garden Inn |
| 5 | 24-Sep-2008 | | Travel - Airfare Company Bill | ˅ | Delta#618 |
| 6 | | | | ˅ | |
| 7 | | | | ˅ | |
| 8 | | | | ˅ | |
| 9 | | | | ˅ | |
| 10 | | | | ˅ | |

Fig. 13

SWITCHING AMONG APPLICATIONS ACCORDING TO DATE-AND-TIME OF SCHEDULE ITEM

TECHNICAL FIELD

This disclosure relates to management of applications, and in particular, a system, apparatus and method for switching among applications according to date-and-time of a schedule item.

BACKGROUND

In the current information age, it has often been discussed that proliferation of information technology (IT) can lead to more convenience, efficiency, productivity, enjoyment, etc., in life. The extensive use and development of IT facilities in work environments and home environments has concomitantly been accompanied by increasing numbers of application software and other information or data sources (hereinafter "applications" or "application"). Such applications may be installed natively, or more popularly, provided through a network (such as a local area network, a wide area network, an intranet, the web, etc.) as a service. For example, SaaS (Software as a Service) is the term used to refer to a popular mode of supplying software applications through the Web. Further, other content or data may be supplied via the Web as a service using SOA (Service-Oriented Architecture).

While many such applications or Web services are currently available, data and information from disparate applications (or Web services or other sources) are not always, and moreover typically are not, supplied in the same format. Further, in many instances, various heterogeneous software applications may be used in a specific context, and such heterogeneity makes it difficult for conventional systems to automate a workflow process in the context.

In a conventional system, a user typically needs to login to each of a plurality of applications. Keeping track of the login information can be a burden for the user, and may pose a security risk, particularly when the user takes short cuts, against best practices, to manage such login information.

While IT tools and facilities can allow one to accomplish more even while remaining at one location, the current trend in our society, as facilitated by assorted new and/or improved technologies and modes of transportation, is for higher levels of mobility. Thus, many people often find themselves traveling on business trips away from the office, although the frequency of such trips of course varies from one person to another person. For those who need to travel often, it would be appreciated that coordination of travel plans and accompanying schedule information is typically a time-consuming, but necessary, part of planning. Further, there is a need, at least in a travel-for-business or travel-for-work context, to keep track of expenses during business trips, in order to report such expenses ultimately (for reimbursement and/or tax purposes).

A typical user may invoke various applications to compile the information and/or data relevant to a business trip. For example, separate trip planning, scheduler and expense reporting applications may be utilized for a business trip.

SUMMARY

In an aspect of this disclosure, there are provided, in response to unsatisfied needs, tools (in the form of systems, apparatuses and methods) that enable a user to utilize various applications, without requiring the user to unnecessarily spend a large amount of time separately entering overlapping or redundant data for each application. To the extent that data in one application can be converted for use in another application, such data of the one application is converted, via the above-mentioned tools at an appropriate time, to data suitable for use in the other application.

The tools, in another aspect of this disclosure, can be configured for use with schedules to assist users with obtaining and maintaining schedule data, and to switch intelligently (that is, when appropriate and based on time information included in schedule data) from an application for generating, maintaining and/or editing a schedule, to another application that performs a specific process by utilizing (in part), or based on, schedule information.

For example, a current date-and-time is compared to the time information of a selected schedule item, and if the current date-and-time is after the date-and-time of the selected schedule item, action is taken to automatically switch from the first application to the second application, convert (one or more of) the schedule data to corresponding data suitable for the second application and transfer the converted data to the second application.

On the other hand, if the current date-and-time (such as when the schedule item is selected) is before the date-and-time of the selected schedule item, the user is allowed to confirm or edit the selected schedule item. Accordingly, the process of maintaining and/or updating schedule information can be automated (at least in part).

In an exemplary embodiment of this disclosure, there is provided a system including a scheduler application configured to maintain an itinerary (which may be generated natively, or may be based on import of a travel itinerary from another application with itinerary items generated based on the imported travel itinerary) for a trip, an expense reporting application configured to output an expense report in connection with the trip, and a management service (which may or may not be a part of the scheduler application) configured to compare time information of a selected itinerary item to a current date-and-time (for example, when the itinerary item is selected, or when a user opens the itinerary maintained by the scheduler application, etc.), and if the current date-and-time is after the time of the selected itinerary item, automatically switch to the expense reporting application and convert one or more itinerary items to corresponding expense reporting items and transfer the expense reporting items to the expense reporting application.

In another aspect, if the current date-and-time is within a predetermined time period before the date-and-time of the selected itinerary item, the scheduler application activates another application to enable check-in by the user in connection with the selected itinerary item.

As another exemplary feature, the system may further comprise a scanning unit configured to read a document and output a document image, and the expense reporting application is configured with a record attachment part to attach, to the expense report, an expense record image output by the scanning unit. The record attachment part can optionally cause to be output a barcode coversheet bearing a barcode encoding a ticket number assigned to the expense report, with the expense record image output by the scanning unit including the barcode coversheet and one or more expense receipts.

There is provided, in another embodiment of this disclosure, a management apparatus configured to switch applications based on time information, that includes a schedule maintaining part configured to generate and maintain (and update) schedule data including time information, a determining part configured to compare a current date-and-time to time information of a selected schedule item, and if the current date-and-time is before the date-and-time of the selected schedule item, specify a first application (for example, a trip planning application, a trip management application, a travel reservation, a hotel reservation application, a rental car reservation, etc.) as a specific application to switch to, and if the current date-and-time is after the date-and-time of the selected schedule item, specify a second application (for example, expense reporting application) as the specific application to switch to, and an application switching part configured to switch to the specific application, and if the specific application is the second application, automatically cause selected schedule data to be converted to converted data suitable for the second application, transfer the converted data to the specific application and cause the specific application to be presented on a display to the user. The above-mentioned management apparatus can include, or be included in, a scheduler application, in which case the scheduler application generates and maintains information for an itinerary of a trip.

The system or management apparatus, in another exemplary embodiment, includes an authentication part configured to maintain authentication information for each authorized user for each of the applications. Accordingly, the workflow, including maintaining and/or updating schedule information, can be automated (at least in part) to minimize the number of application logins.

In another embodiment of this disclosure, there is provided a method for switching applications based on time information, including providing a first application configured to generate and maintain schedule data including time information, and a second application configured to perform a specific process by utilizing schedule information, receiving user selection of a schedule item in the first application and comparing a current date-and-time to time information of the selected schedule item, and if the comparison indicates that the current date-and-time is after the date-and-time of the selected schedule item, automatically causing schedule data to be converted to corresponding data suitable for the second application, transferring the converted data to the second application and causing the second application to be displayed with the converted date.

BRIEF DESCRIPTION OF THE DRAWINGS

The above-mentioned and other aspects, features and advantages can be more readily understood from the following detailed description with reference to the accompanying drawings wherein:

FIG. 5 shows an example of a table maintained by the management server of FIG. 2, for user authentication;

FIG. 6 shows an example of an itinerary output by Application A in a business travel example discussed infra;

FIG. 8 shows a Table of Itinerary items for the example of FIG. 6;

FIG. 9 shows a Table of Air for the example of FIG. 6;

FIG. 10 shows a Table of Car for the example of FIG. 6;

FIG. 11 shows a Table of Hotel for the example of FIG. 6;

FIG. 12A shows a conversion table for conversion between Applications A and C in the example of FIG. 6;

FIG. 12B shows another conversion table for conversion between Applications A and C in the example of FIG. 6;

FIG. 13 shows a user interface for Application C (expense reporting), in the example of FIG. 6;

DETAILED DESCRIPTION OF EXEMPLARY EMBODIMENTS

Figure 1A:
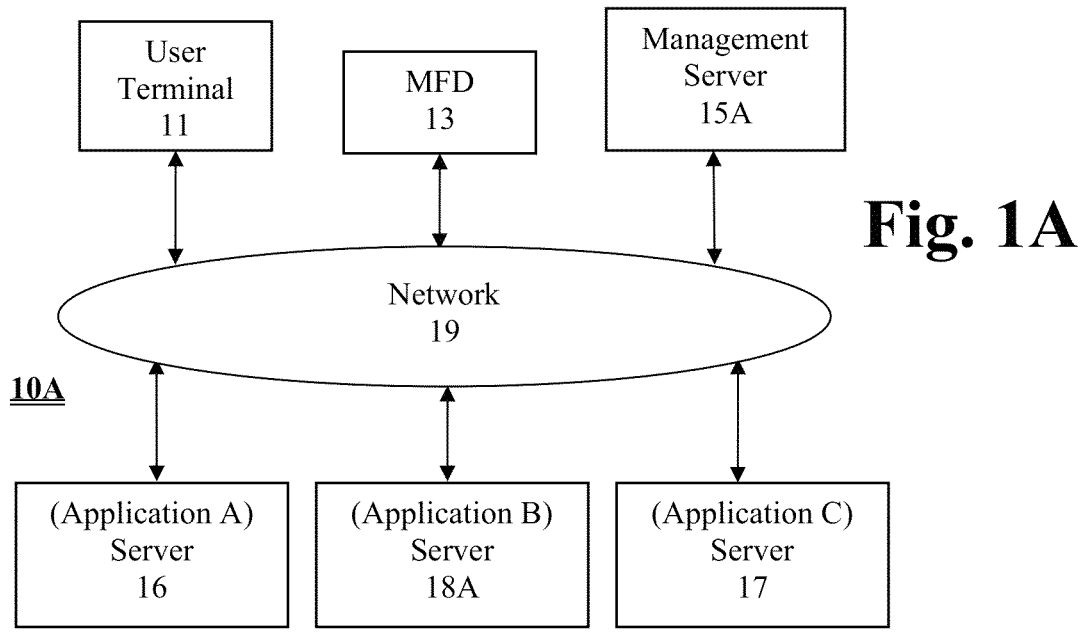
FIG. 1A shows a block diagram of a system, according to an exemplary embodiment of this disclosure.

In describing preferred embodiments and examples illustrated in the drawings, specific terminology is employed for the sake of clarity. However, such description in this disclosure is not intended to be limited to the specific terminology so selected and it is to be understood that each specific element includes all technical equivalents that operate in a similar manner. In addition, detailed descriptions of known functions and configurations will be omitted when they may obscure the inventive aspects of this disclosure.

Referring now to the drawings, wherein like reference numerals designate identical or corresponding parts throughout the several views, FIG. 1A shows schematically an example of a system wherein a user, when properly authenticated and using a terminal, can access information, documents, data and other content, obtain schedule information and have access to information from a plurality of applications and/or other information/data sources (for example, databases, document stores, etc.). System 10A, as shown in FIG. 1A, includes a user terminal 11, multi-function device (MFD) 13, management server 15A and application servers 16, 17, 18A for providing applications A through C, respectively, interconnected through network 19. It should be appreciated that FIG. 1A merely shows an example and that various variations are possible.

For example, while the system shown in FIG. 1A includes one user terminal 11 and three application servers 16, 17, 18A, it should be appreciated that such numbers of terminal and applications are arbitrarily selected as an example in order to facilitate discussion, and that the subject matter of this disclosure can be implemented in a system including one or more terminals and two or more applications. Further, it should be understood that while the multi-function device 13 is shown in the system 10 as a system component separate from the user terminal 11 and the management server 15A, the multi-function device can optionally serve as a user terminal and/or as the management server as well (assuming the device has adequate, processing, storage and communication resources). In addition, while separate computing devices are typically used for the management server 15A and application servers 16, 17, 18A, it should be understood that one computer (with adequate processing, storage and communication resources) can optionally provide the hardware platform for two or more of the servers.

Figure 1B:
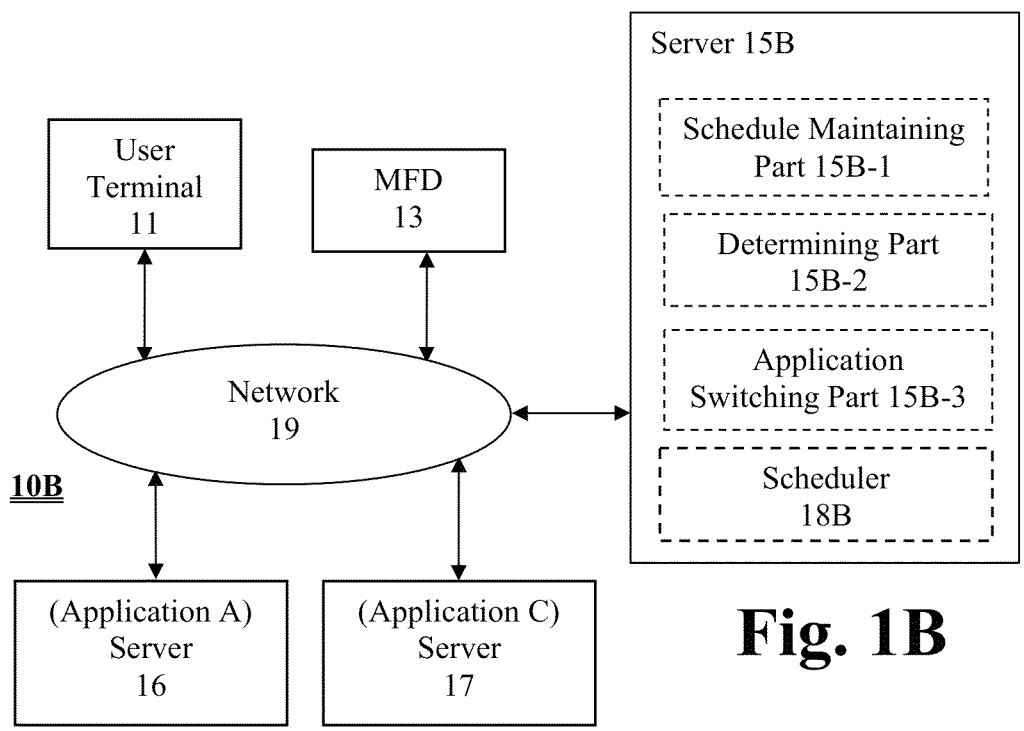
FIG. 1B shows a block diagram of a system, according to another exemplary embodiment of this disclosure.

For example, in system 10B shown in FIG. 1B, management server 15A and application server 18A are replaced by server 15B which is configured to provide management functionality, as well as additional functionality (such as a scheduler application), as a service. The server 15B is software-configured to provide assorted functionalities, through, for example, schedule maintaining part 15B-1, data obtaining part 15B-2, document generation part 15B-3 and optional scheduler part 18B. The schedule maintaining part, data obtaining part, document generation part and scheduler part are discussed herein infra.

The management and scheduler functionalities can be integrated in any of various embodiments. For example, in system 10C shown in FIG. 1C, such functionalities are provided natively on terminal 11C, such as through, for example, schedule maintaining part 15C-1, data obtaining part 15C-2, document generation part 15C-3 and optional scheduler part 18C.

Further, multiple applications of interest may be provided natively on the terminal. For example, in system 10D shown in FIG. 1D, terminal 11D is configured to include schedule maintaining part 15D-1, data obtaining part 15D-2, document generation part 15D-3, optional scheduler application 18D, application A 16D and application C 17D. It should be appreciated that virtually any of the applications can be provided natively or by a server through a network (although the current trend is to provide applications through the network).

The network 19 can include one or more of a local area network, a wide area network, the Internet, other communications links (such as a virtual private network, a wireless link, etc.), or a combination thereof. In addition, the network 15 preferably uses TCP/IP (Transmission Control Protocol/Internet Protocol), but other protocols can also be used. Each of the devices connected to the network 19 is configured with an appropriate network interface to enable the device to communicate with other devices connected to the network. How devices can connect to and communicate over the network 19 is well-known in the art and therefore in the interest of brevity and clarity, a detailed discussion of such network connection and communication is omitted. Instead, the reader is referred to, for example, "How Networks Work", by Frank J. Derfler, Jr. and Les Freed (Que Corporation 2000) and "How Computers Work", by Ron White, (Que Corporation 1999), the entire contents of each of which are incorporated herein by reference.

The management server 15A can be configured to provide a user interface via the network 19 to the user terminal 11 through which a user can enter user credential information, as well as other information. The management server then performs user authentication by using the user credential information, to determine whether the user is authorized to obtain the benefit of the management service. The management server maintains (for example, in a table as shown in FIG. 5, or another structure) user authentication information for each authorized user for each of various applications that require user authentication, and when the user attempts to access the application, automatically retrieves the appropriate authentication information of the user and enables authentication of the user with respect to the selected application. Thus, the user needs to login only once per session, to the management server, and does not need to enter application login information for each and every application access during the session.

Figure 2:
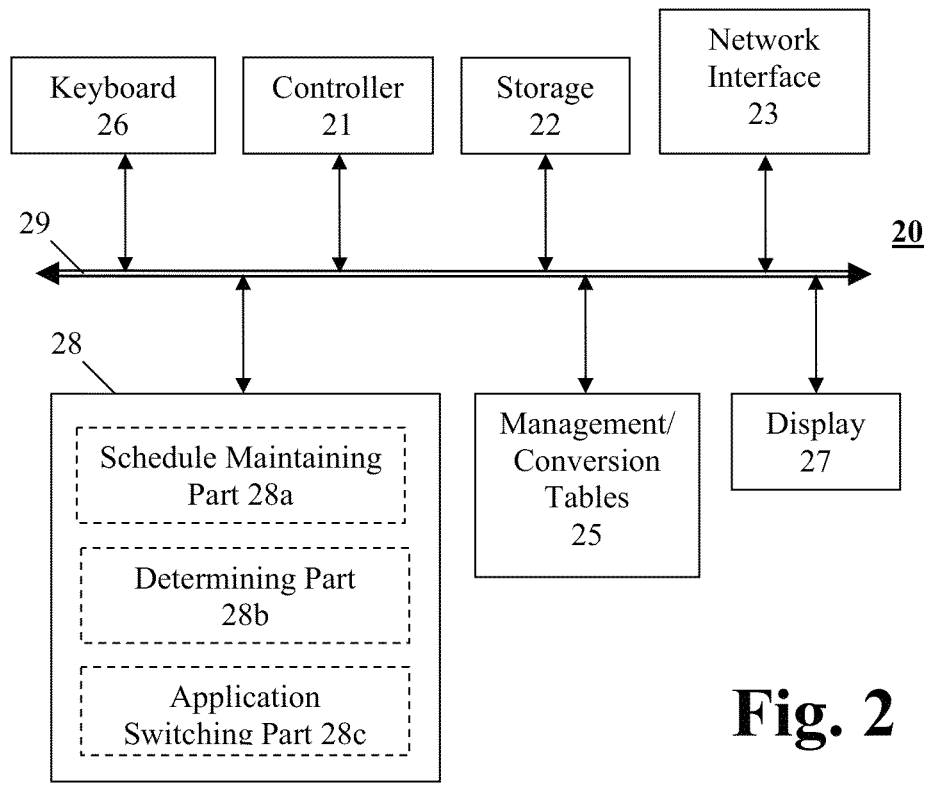
FIG. 2 shows an example of configuration of a management server according to the exemplary embodiment of FIG. 1A.

FIG. 2 shows an exemplary constitution of various components of a server computer 20, including controller (or central processing unit) 21 that communicates with a number of other components, including memory or storage part 22, network interface 23, keyboard 26 and display 27, by way of a system bus 29. In addition, the server 20 is configured through software to include management functionalities 28 comprising schedule maintaining part 28a, data obtaining part 28b and document generation part 28c.

The server 20 may be a special-purpose device (such as including one or more application specific integrated circuits or an appropriate network of conventional component circuits) or it may be software-configured on a conventional personal computer or computer workstation with sufficient memory, processing and communication capabilities to operate as a server.

In server 20, controller 21, memory/storage 22, network interface 23, keyboard 26 and display 27 are conventional except as discussed below, and therefore in order to avoid occluding the inventive aspects of this disclosure, such conventional aspects will not be discussed in detail herein.

The controller 21 executing program code instructions controls server operations, including maintaining management and conversion tables 25 (examples of which are shown in FIGS. 5-13) and providing management functionality 28.

The server 20 registers user authentication information in management table 25. The registered user authentication information may include user identification and password for logging in to the management server as well as authentication information for one or more applications or information/data sources. It should be appreciated that login need not necessarily include entry of a password, but other authentication measures, such as biometrics means (for example, comparing fingerprints, palm prints, voice or speech patterns, retinas or irises, facial expressions or features, signature, etc.), may alternatively be used.

The server 20 includes network interface 23 for communications through a network, such as communications through the network 19 with the terminal 11, MFD 13, and application servers 16, 17, 18A in the system of FIG. 1A. However, it should be appreciated that the subject matter of this disclosure is not limited to such configuration. For example, the management server may communicate with the other devices through direct connections and/or through a network to which the user terminal is not connected. As another example, the management server need not be provided by a server that services client terminals, but rather may communicate with the terminal on a peer basis, or in another fashion.

In a preferred embodiment, the management server can be configured to provide the herein-mentioned management functionalities (as well as the aforementioned applications A, B, C) as web services. Supplying software functionalities and/or applications as web services is well-known in the art and therefore in the interest of brevity and clarity, a detailed discussion of such network connection and communication is omitted. Instead, the reader is referred to, for example, "Web Services Architecture", W3C Working Group (11 Feb. 2004; http://www.w3.org/TR/2004/NOTE-ws-arch-20040211/), the entire contents of which are incorporated herein by reference.

Figure 1C:
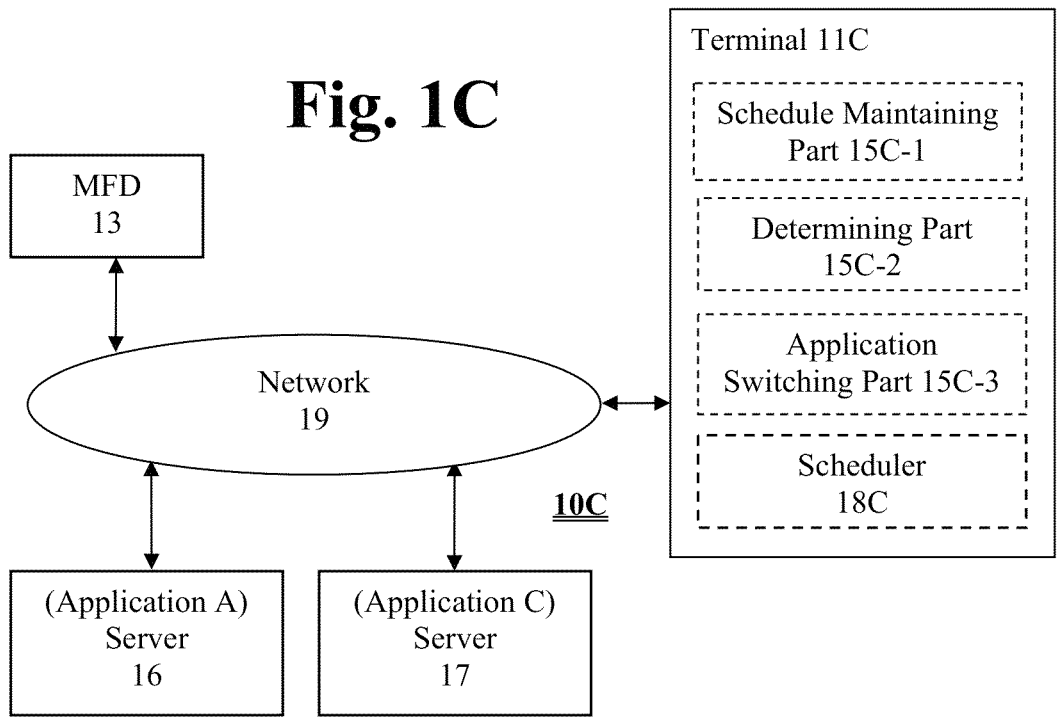
FIG. 1C shows a block diagram of a system, according to another exemplary embodiment of this disclosure.
Figure 1D:
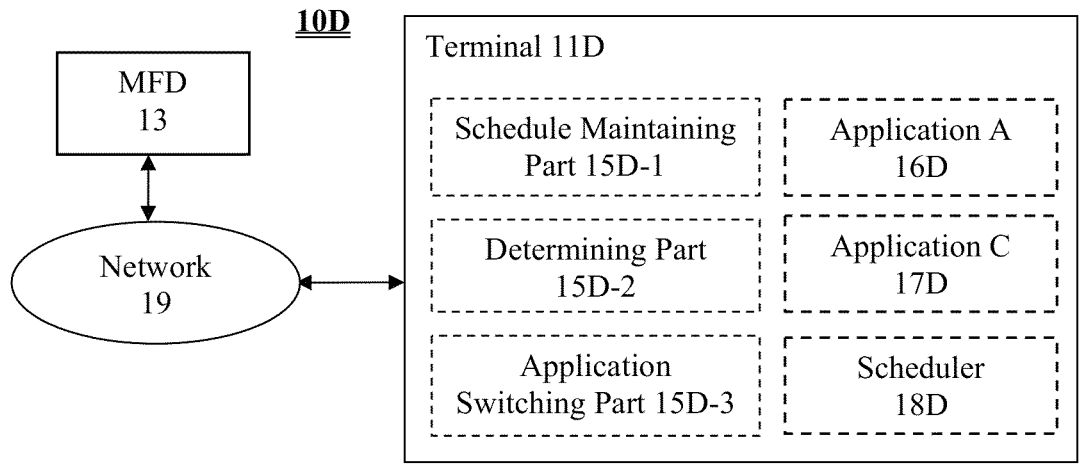
FIG. 1D shows a block diagram of a system, according to another exemplary embodiment of this disclosure.
Figure 3:
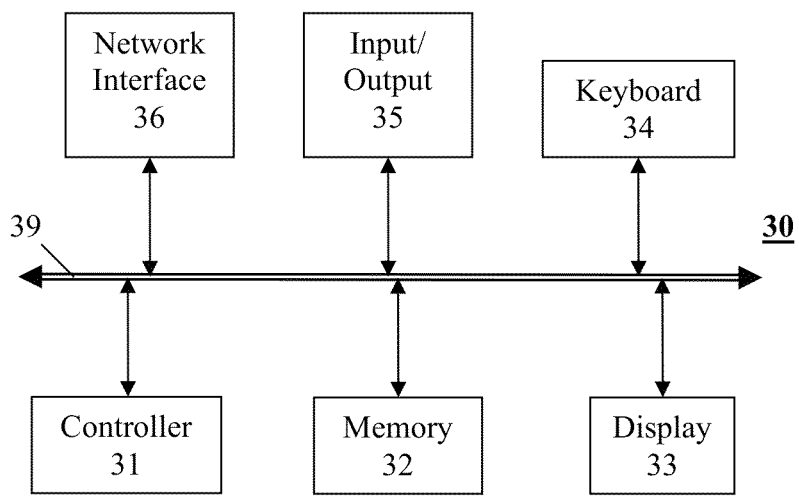
FIG. 3 shows an example of configuration of a user terminal in the system shown in FIG. 1A.

As mentioned above, the management functionalities can comprise, inter alia, a schedule maintaining part (28a in FIG. 2, 15B-1 in FIG. 1B, 15C-1 in FIG. 1C, 15D-1 in FIG. 1D), a data obtaining part (28b in FIG. 2, 15B-2 in FIG. 1B, 15C-2 in FIG. 1C, 15D-2 in FIG. 1D) and a document generation part (28c in FIG. 2, 15B-3 in FIG. 1B, 15C-3 in FIG. 1C, 15D-3 in FIG. 1D). The management functionalities, individually or in combination, may be an application invoked upon request from a user and/or terminal, or may be an automated service (like a system function), transparent to the user.

The schedule maintaining part maintains schedule data including time information for or in combination with a scheduler application or scheduler part. The schedule maintaining part may provide a user interface to allow the user to enter or edit schedule information. On the other hand, the schedule maintaining part may be configured with an import function to import the schedule data from another application (or data store or source). Such import function is typically configured to include data conversion of source data to data suitable for use by the management service or application.

An aspect of this disclosure, as mentioned supra, is to automatically switch to an appropriate application, if a schedule item is elected.

The determining part compares a current date-and-time to time information of a selected schedule item, to determine a specific application, if any, to switch to. For example, if the current date-and-time is before the date-and-time of the selected schedule item, the determining part may specify or determine an application for performing trip management, trip booking, airline reservation, hotel reservation, rental car reservation, etc., as a specific application to switch to. On the other hand, if the current date-and-time is after the date-and-time of the selected schedule item, the determining part may specify or determine an expense reporting application (or the like) as the specific application to switch to.

The application switching part switches to the specific application, upon determination or specification of the specific application by the determining part. If the specific application is, for example, an expense reporting application, the application switching part automatically causes selected schedule data to be converted to data suitable for the expense reporting application, the converted data to be transferred to the specific application and the expense reporting application to be presented on a display to the user. On the other hand, if the specific application is, for example, a trip management application (and the selected schedule item is an itinerary item), the application switching part automatically can cause the trip management application to allow the user to confirm or edit the selected itinerary item.

As another example, if the current date-and-time is within a predetermined time period before the date-and-time of the selected itinerary item, the application switching part activates the application for performing trip management, trip booking, airline reservation, hotel reservation, rental car reservation, etc., to enable check-in by the user in connection with the selected itinerary item.

The user terminal 11 configured with software (for example, a browser) allowing the user terminal to communicate through the network 19 with the management server 15A or server 15B can receive a user interface from the server through which a user can enter user credential information (which may or may not be stored locally). After the user credential information has been authenticated, the user terminal communicating with the server through the network can request a specified schedule. In the embodiment of FIG. 1A or 1B, such request is transmitted to the server 15A or 15B, and the server retrieves and returns the requested schedule to the user terminal 11. On the other hand, in the embodiment of FIG. 1C or FIG. 1D, the schedule retrieval request is typically processed natively on the terminal 11C or 11D, and the requested schedule can be retrieved from local storage, external storage, network-connected storage, or a combination thereof.

The user terminal 11 can be any computing device, including but not limited to a personal, notebook or workstation computer, a kiosk, a PDA (personal digital assistant), a mobile or smart phone or handset, another information terminal, etc., that can communicate through the network 19 with other devices. Although only one user terminal is shown in FIG. 1, it should be understood that the system 10 can include a plurality of user terminal devices (which can have similar or different configurations).

The terminal 11 can interact (exchange data) with the management server 15A (FIG. 1A) or server 15B (FIG. 1B) via the network 19, so as to benefit from the services provided by the server. For example, a schedule retrieval request can be sent from the terminal 11 to the server. As another example, the terminal 11 can transmit other information as well, such as, for example, user identification, password, the name of the person operating the terminal, etc.

An example of a configuration of the user terminal (for example, as a computer) is shown schematically in FIG. 3. In FIG. 3, user terminal 30 includes a controller (or central processing unit) 31 that communicates with a number of other components, including memory and/or storage 32, display 33, keyboard (and/or keypad) 34, other input/output (such as mouse, touchpad, stylus, microphone and/or speaker with voice/speech interface and/or recognition software, etc.) 35, network interface 36 and print driver 37, by way of internal bus 39. In addition, as mentioned above, the management functionalities are preferably provided as a service by a server to a requesting terminal, but can alternatively be provided natively on a terminal (such as, for example, terminal 11C shown in FIG. 1C, terminal 11D shown in FIG. 1D, or another appropriately configured terminal). Such functionalities are not shown in FIG. 3, but the terminal 30, as one should appreciate (particularly in view of this disclosure), can be configured appropriately through software to include such functionalities.

The memory 32 can provide storage for program and data, and may include a combination of assorted conventional storage devices, such as buffers, registers, memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), FLASH, etc.].

The network interface 36 provides a connection (for example, by way of an Ethernet connection or other network connection which supports any desired network protocol such as, but not limited to TCP/IP, IPX, IPX/SPX, or NetBEUI) to network 19.

A user interface can be provided and can be configured through software natively or received through a network connection, to allow the user to access electronic data or content on the terminal and/or via the network, interact with network-connected devices and services, enjoy other software-driven functionalities, etc. For example, a browser (such as Internet Explorer™, Netscape Navigator™, a proprietary browser, etc.) may be provided on the terminal so that a user of the terminal can use browsing operations to communicate with the management server 15A (or server 15B) and/or access other data or content.

Additional aspects or components of the user terminal 30 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J.

Derfler, Jr. and Les Freed (Que Corporation 2000), the entire contents of each of which are incorporated herein by reference.

As mentioned above, the user terminal 11 is not limited to a personal computer, but can be manifested in a form of any of various devices that can be configured to communicate over a network and/or the Internet.

Figure 4:
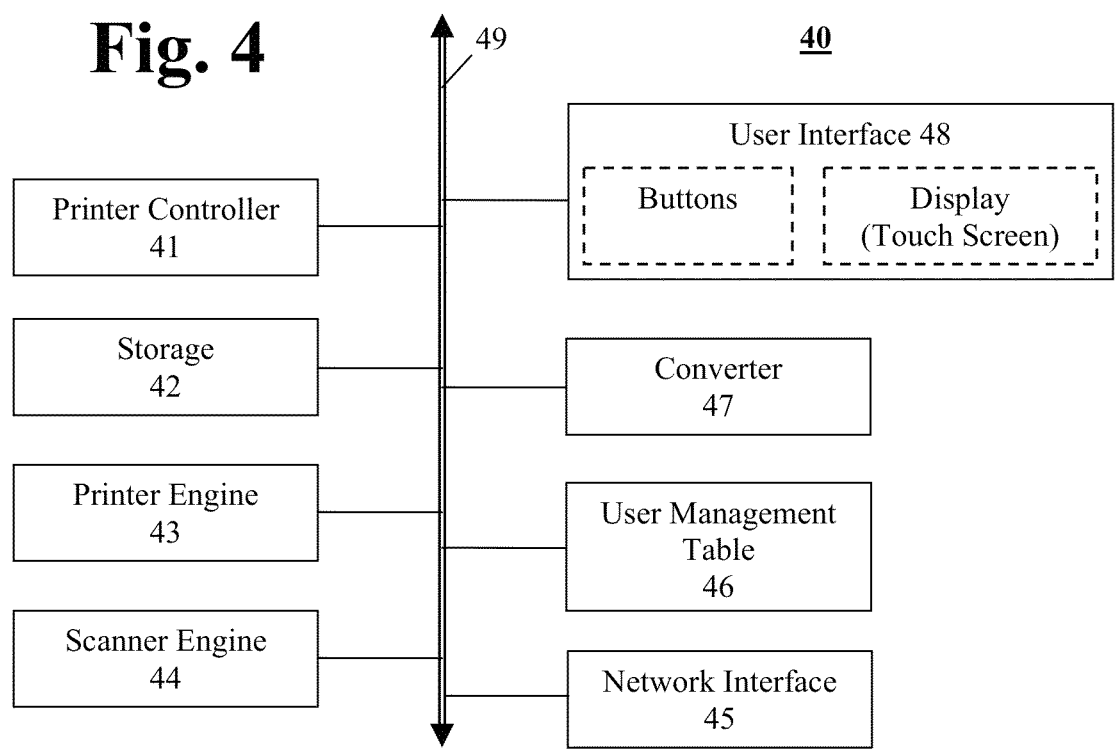
FIG. 4 shows a block diagram of a multi-function apparatus in the system of FIG. 1A.

FIG. 4 shows an example of a multi-function device (MFD) or multi-functional peripheral device (MFP) which includes scanning and printing functions, and additionally can serve as a user terminal for entering, saving and accessing electronic data or documents. In addition, as mentioned above, while the user terminal 11 and management server 15A (or server 15B) are shown in FIG. 1A (or FIG. 1B) as distinct components, it should be understood that such components can be resident within a MFD (multi-function device).

MFD apparatus 40 shown in FIG. 4 includes a controller 41, and various elements connected to the controller 41 by an internal bus 49, including storage 42 (for example, random access memory, read-only memory, hard disk drive, portable storage media drive such as for optical discs, magnetic discs, magneto-optical discs, etc., semiconductor memory cards, combinations of storage media, etc.), printer engine 43, scanner engine 44, network interface (I/F) 45, converter 47 for converting data from one format to another format (for example, a format suitable for printing, faxing, e-mailing, etc.), and user interface 48. The controller 41 controls and monitors operations of the MFP 40, and utilizes information stored in user management table 46 to authenticate the user and control user access to the functionalities of the MFP.

Storage 42 can include one or more storage parts or devices, and program code instructions can be stored in one or more parts or devices of storage 42, and retrieved and executed by the controller 41 to carry out the instructions. Such instructions can include instructions for performing specified functions (such as printing, scanning, faxing, copying, e-mailing, etc.) of the MFP, enable the MFP to interact with a terminal and/or the management server, as well as perhaps other external devices, through the network interface 45, and to control the converter 47, access data in the user management table 46, and interactions with users through the user interface 48.

The user interface 48 includes one or more display screens that display, under control of controller 41, information allowing the user of the MFP 40 to interact with the MFP. The display screen can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFP, so as to allow the operator to interact conveniently with services provided on the MFD, or with the MFD serving as terminal for accessing electronic data or other content through the network. For example, a browser (such as Internet Explorer™, Netscape Navigator™, a proprietary browser, etc.) may be provided on the MFD so that the operator can use browsing operations to access a database in system 10. As another example, the operator can scan a document, and use the browser to upload the image data from scanning of the document (and specify additional information associated with the image) to a database.

The display screen does not need to be integral with, or embedded in, a housing of the MFP, but may simply be coupled to the MFP by either a wire or a wireless connection. The user interface 48 may include keys and/or buttons (such as graphical keys or buttons, or other graphical elements, of a GUI on a touchscreen display) for inputting information or requesting various operations. Alternatively, the user interface 48 and the display screen may be operated by a keyboard, a mouse, a remote control, voice recognition, or eye-movement tracking, or a combination thereof.

Since the MFP 40 is typically shared by a number of users, and is typically stationed in a common area, the MFP preferably prompts the user to supply user credential or authentication information, such as user name (or other user or group information), password, access code, etc. The user credential or authentication information can be compared to data stored in the user management table 46 to confirm that the user is authorized to use the MFP. The user credential or authentication information may also be stored for the session and automatically supplied if access to other devices through the network requires it. On the other hand, such other devices may prompt the user to supply other user credential or authentication information through the user interface. In any event, it should be appreciated that the management table 46 can be expanded to include functions similar to the functions of management table 25 maintained by the management server 20, particularly when the MFD device is configured to serve as the management server in the system.

Other methods of authentication may also be used. For example, the multi-function device may be equipped with a card reader or one or more biometrics means (such as comparing fingerprints, palm prints, voice or speech, retinas or irises, facial expressions or features, signature, etc.).

Printer engine 43, scanner engine 44 and network interface 45 (similar to interface 23 in FIG. 2 and interface 36 in FIG. 3) are otherwise conventional, and therefore, a detailed description of such conventional aspects are omitted in the interest of clarity and brevity (so as not to mask the novel aspects of the subject matter of this disclosure).

The MFD 40 can have any or all of the functions of similar devices conventionally known, such as for scanning, editing and storing images, sending a fax, sending and receiving e-mails with or without attachments, accessing files by FTP or another protocol or facility, surfing the Web, etc. Further, multi-functional devices or multi-function peripheral devices can play a prominent role to convert hardcopy documents to electronic documents.

As mentioned supra, an aspect of this disclosure is to provide automated and intelligent application switching and another aspect is to automate data conversion (as much as possible in the context), when the user selects a schedule item, in order to enable a user to utilize various applications, without requiring the user to unnecessarily spend a large amount of time separately entering overlapping or redundant data for each application.

An approach for converting data of one application to corresponding data suitable for another application will be discussed infra by reference to a business travel example in which one or more applications are used for booking or making reservations for various segments of a business trip, and corresponding data is generated and maintained in a scheduler application or part of a management apparatus for managing a schedule. At an appropriate time, selected data (maintained by the scheduler) is converted to corresponding data suitable for an expense report application. The aforementioned example is discussed infra with reference to FIGS. 6-13.

In the business travel context, it is typically desirable for the business traveler to have an itinerary, in order to remind the traveler of where the traveler should be at each specified date-and-time. FIG. 6 shows an example of such an itinerary including time information for confirmed flights, car rental and hotel accommodations.

In the example of FIG. 6, the traveler is scheduled to travel by air from New York (departing at 9:00 a.m.) to San Francisco on September 22 (throughout this example, no year is specified; however, date information typically will include year, month and day of month), with a transfer in Salt Lake City. On the same day, the traveler is scheduled to pick-up a rental car at the specified car rental agency at the San Francisco airport at 4:01 p.m. The traveler is also confirmed to stay at the specified hotel with check-in on September 22 and check-out on September 24. The return flight from San Francisco to New York is confirmed for the red-eye flight departing at 9:45 p.m. on September 24.

The itinerary shown in FIG. 6 is preferably an electronic itinerary, such as can typically be generated by a travel management application (hereinafter "Application A"), in order to facilitate data conversion for import by or into the aforementioned schedule maintenance part and/or scheduler application (hereinafter "Application B").

In the example shown in FIGS. 7-12, a plurality of tables are maintained for performing data conversion from one Application to another Application. However, it should be appreciated that other modes (such as via rules, relational database, etc.) of data conversion.

Figure 7:
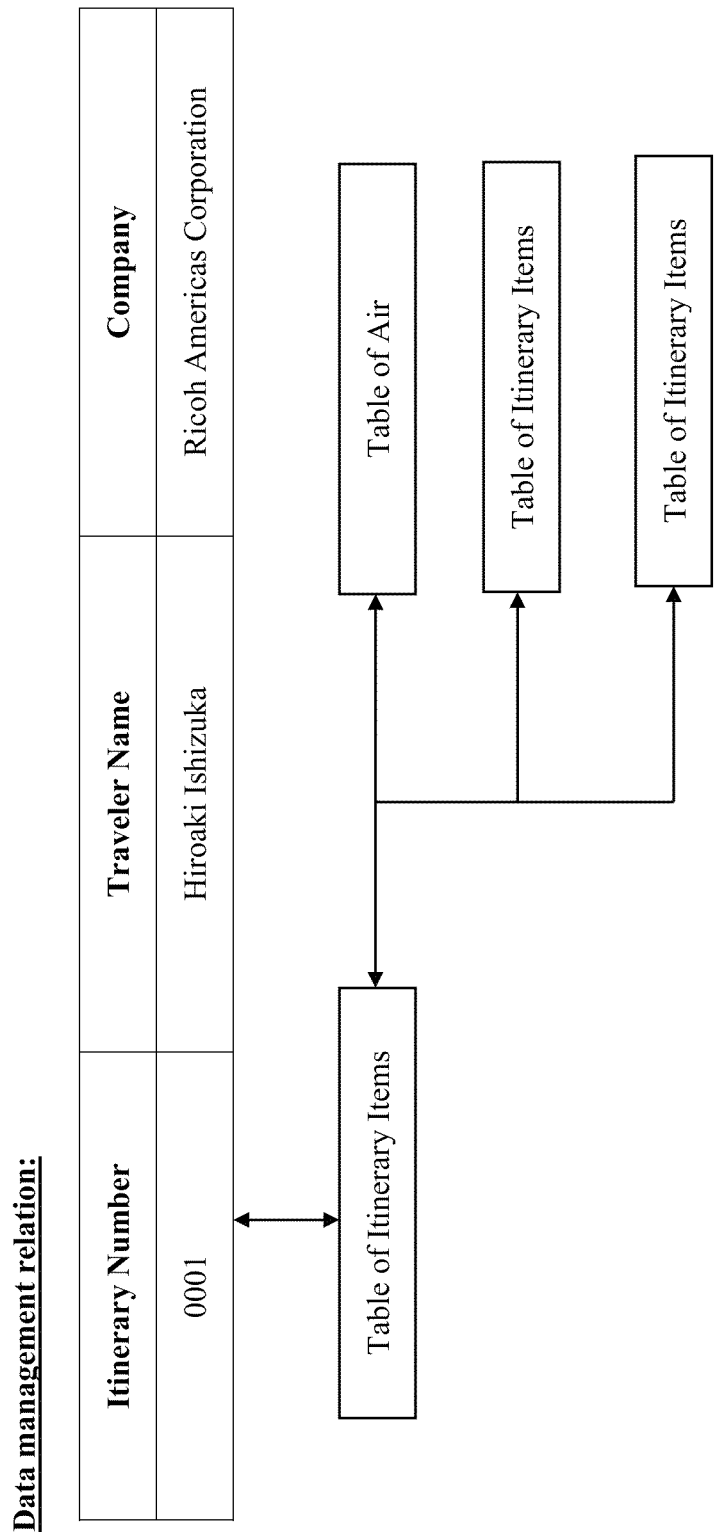
FIG. 7 shows graphically data management relation between the itinerary of FIG. 6 and tables (Table of Itinerary items, Table of Air, Table of Car and Table of Hotel) maintained by a schedule maintaining part, in the example of FIG. 6.

Each itinerary (for example, itinerary #1 of traveler Hiroaki Ishizuka of Ricoh Americas Corporation) from Application A is associated with a table of itinerary items in Application B, and the table of itinerary items is associated with a plurality of tables (in this example, Table of Air, Table of Car, Table of Hotel), as shown in FIG. 7.

The table of itinerary items indicates for each itinerary number, the itinerary items associated with the itinerary number, as shown in FIG. 8.

Examples of Table of Air, Table of Car and Table of Hotel are shown in FIGS. 9-11, respectively. As should be apparent from comparison of FIGS. 9-11 with FIG. 6, the tables typically have a higher level of data granularity than the corresponding to itinerary. For example, the Table of Air has columns for date, departing, destination, departure time, airline URL (uniform resource locator), flight number and confirmation number, and such information is extracted from two columns of the source itinerary. Likewise, the information in the columns of pick up, return, place, pick-up time, rental column, confirmation number in the Table of Car and the information in the columns of check-in, check-out, hotel, address and confirmation number are extracted from two columns of the source itinerary. Such higher level of granularity facilitates data conversion and therefore is preferred herein.

FIGS. 12A and 12B show respective conversion tables, and FIG. 13 shows a user interface for Application C (expense reporting).

As shown in FIG. 12A, some itinerary items (for example, car, hotel, air) are associated with corresponding expense types (for example, car rental, lodging, "Travel—Airfare Company Bill"). However, other expense types, such as taxi, limo, parking/tolls, travel meals, "Airfare" (that is, not for a pre-booked flight) are not associated with corresponding itinerary items (therefore indicated as "N/A" in this example).

The date of an expense item, as shown in FIG. 12B, is associated with the date of an Air itinerary item, pick-up date of a Car itinerary item and check-in date of a Hotel itinerary item. The justification of an expense item is, in the case of an Air itinerary item, a combination of name of airline and flight number; in the case of a Car itinerary item, name of rental company; and in the case of a Hotel itinerary item, name of hotel.

Data conversion utilizing the aforementioned tables in this example yields the expense reporting information as presented in the user interface shown in FIG. 13. As should be apparent, the expense report is not complete, since the user has yet to enter the receipt amount for each expense item. However, a substantial portion of the data entry can be avoided through the automated process.

Figure 14:
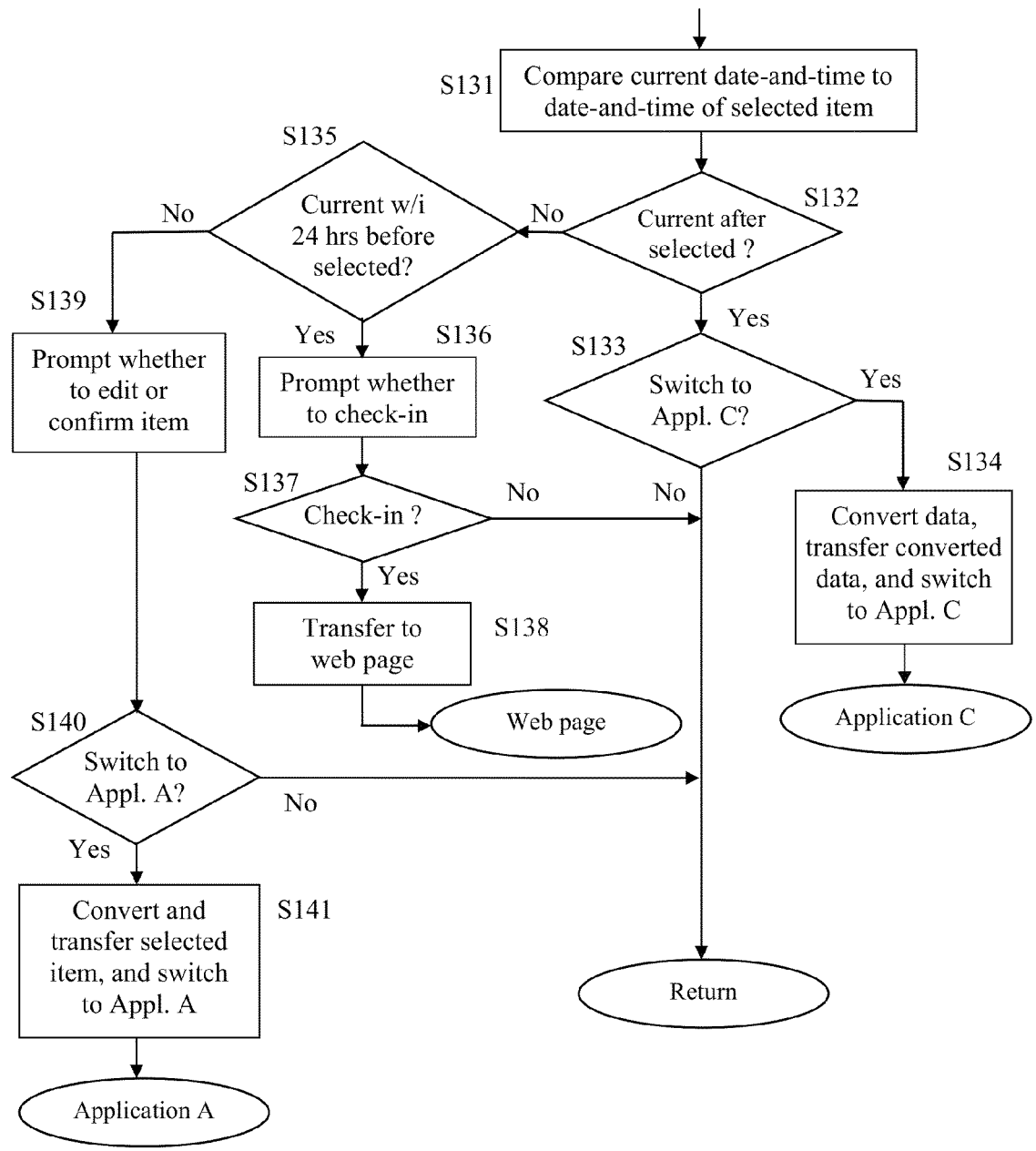
FIG. 14 shows a flow chart for a method for switching applications based on time information, according to an embodiment of this disclosure.

A method for switching applications, when any itinerary item is selected, and based on time information, will now be explained with reference to FIG. 14, in accordance with an embodiment of this disclosure.

When an itinerary item is selected, the then-current date-and-time (for example, time-and-date when item is elected or when the application is opened) is compared to the date-and-time of the selected item (step S131). If the current date-and-time (for example, time-and-date when item is elected or when the application is opened) is after the date-and-time of the selected item (step S132, Yes), it is determined whether to switch to Application C (step S133), such as for expense reporting. For example, the user may be prompted whether to switch to Application C. However, automation of such switching to Application C (step S133, Yes) is preferable, data of the selected itinerary item is converted into corresponding data suitable for Application C, and the converted data is transferred to Application C (step S134). The data conversion may be performed in addition for some (for example, itinerary items that have already past, that is, the date-and-time of which is before the current date-and-time) or all of the remaining itinerary items as well.

On the other hand, if the current date-and-time is after the date-and-time of the selected item (step S132, No), it is determined whether the current date-and-time is within a predetermined amount of time (for example, 24 hours) before the date-and-time of the selected item (step S135). If the current date-and-time is within the predetermined amount of time before the date-and-time of the selected item (step S135, Yes), the user is prompted in step S136 whether he/she wishes to check-in in connection with the selected itinerary item (for example, a flight). If the user indicates that he/she wishes to check-in in connection with the selected itinerary item (step S137, Yes), the URL (uniform resource locator) of the appropriate web page associated with the selected itinerary item is transferred to Application A (step S138), for check-in.

If the current date-and-time is not within the predetermined amount of time before the date-and-time of the selected item (step S135, No), it is determined whether to switch to Application A (step S140), such as for trip management. If it is determined to switch to Application A (step S140, Yes), data for the selected item is converted and the converted data is transferred to Application A, to allow the user to confirm or edit the selected itinerary item (step S141).

Figure 15:
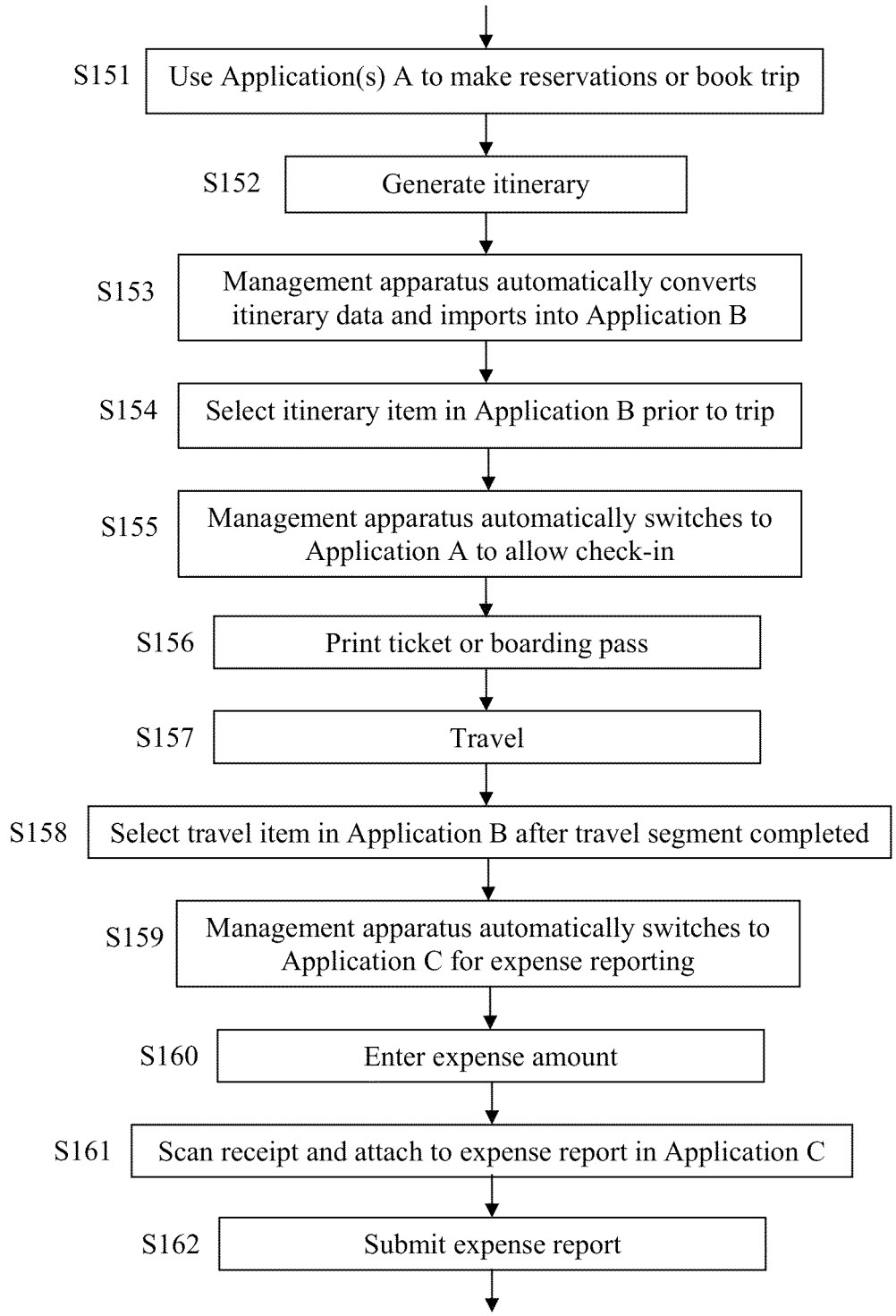
FIG. 15 shows a flow chart for an exemplary work flow, in accordance with an example of this disclosure.

An example of a typical work flow, including the aforementioned automated processes for switching and data conversion will now be explained with reference to FIG. 15.

The user typically uses Application A to make reservations (such as air or rail transportation, car rental, hotel, etc.) and/or book a trip (step S151). At the conclusion of the reservations and/or booking, Application A provides an electronic itinerary (step S152). Such itinerary (for example, FIG. 6) may be e-mailed to or downloaded by the user.

When the user retrieves the itinerary, such as utilizing Application B (scheduler or another software including the aforementioned schedule maintaining part), at a later time, the itinerary data is imported and converted into corresponding data suitable for Application B (step S153), such as, for example, shown in the tables of FIGS. 7-12. When the user selects an item in Application B prior to the date-and-time of the selected item (step S154), Application B configured with the aforementioned determining part and application switching part switches to Application A to allow the user to check-in (step S155). After check-in, a ticket, boarding pass or some other documentation of reservation or booking is typically printed (step S156), and later the user uses the printed documentation in the trip (step S157).

Subsequently, the user may open Application B and select an item that has been completed (step S158), that is, date-and-time of the item has passed (even if the user is still in the middle of the trip). Application B with the aforementioned determining part and application switching part switches to Application C to permit expense reporting (step S159). The user utilizes Application C to enter expense amount(s) (step S160), and typically will be required to attach receipts to the expense report in Application C (step S161). After the trip is over and all expenses have been entered in Application C, the user submits an expense report (step S162).

The above specific embodiments and examples are illustrative, and many variations can be introduced on these embodiments and examples without departing from the spirit of the disclosure or from the scope of the appended claims. For example, elements and/or features of different examples and illustrative embodiments may be combined with each other and/or substituted for each other within the scope of this disclosure and scope of the appended claims.

What is claimed is:

1. A system configured to switch amongst two or more applications based on time information, said system comprising a processor and a non-transitory storage medium embodying instructions executable by the processor to configure the system to include:
   a first application configured to generate and maintain schedule data including time information;
   a second application configured to perform a specific process by utilizing schedule information; and
   wherein said first application is further configured to compare a current date-and-time at which a schedule item is selected by a user to a date-and-time indicated by the time information of the selected schedule item, and if the current date-and-time at which the schedule item is selected is after the date-and-time of the selected schedule item, automatically switch to the second application, convert one or more of the schedule data to corresponding data suitable for the second application and transfer the converted data to the second application.

2. The system as claimed in claim 1, wherein if the current date-and-time when the schedule item is selected is before the date-and-time of the selected schedule item, said first application activates a third application to enable the user to confirm or edit the selected schedule item.

3. The system as claimed in claim 1, wherein said first application is a scheduler application and the schedule information includes information generated and maintained by said scheduler application for an itinerary of a trip.

4. The system as claimed in claim 3, wherein if a current date when the user opens the itinerary maintained by the scheduler application is before a scheduled date of a selected itinerary item, said first application activates a third application to enable the user to confirm or edit the selected itinerary item.

5. The system as claimed in claim 3, wherein if a current date-and-time when an itinerary item is selected or when the user opens the itinerary maintained by the scheduler application is within a predetermined time period before the date-and-time of the selected itinerary item, said scheduler application activates another application to enable check-in by the user in connection with the selected itinerary item.

6. The system as claimed in claim 3, wherein said scheduler application is further configured to automatically input a travel itinerary from another application and generate itinerary items based on the imported travel itinerary.

7. The system as claimed in claim 3, wherein said second application is an expense reporting application configured to output an expense report in connection with the trip.

8. The system as claimed in claim 7, further comprising:
   a scanning unit configured to output a document image,
   wherein said expense reporting application includes a record attachment part configured to attach, to the expense report, an expense record image output by the scanning unit.

9. The system as claimed in claim 8, wherein the record attachment part causes to be output a barcode coversheet bearing a barcode encoding a ticket number assigned to the expense report, and the expense record image output by the scanning unit corresponds to the barcode coversheet and one or more expense receipts.

10. The system as claimed in claim 7, further comprising an authentication part configured to maintain authentication information for each authorized user for each of the scheduler application and the expense reporting application.

11. A management apparatus configured to switch applications based on time information, said management apparatus comprising a processor and a non-transitory storage medium embodying instructions executable by the processor to configure the management apparatus to include:
    a schedule maintaining part configured to generate and maintain schedule data including time information;
    a determining part configured to compare a current date-and-time at which a schedule item is selected by a user to a time information of the selected schedule item, and if the current date-and-time is before a date-and-time indicated by the time information of the selected schedule item, specify a first application as a specific application to switch to, and if the current date-and-time is after the date-and-time of the elected schedule item, specify a second application as the specific application to switch to; and
    an application switching part configured to switch to the specific application, and if the specific application is the second application, automatically cause selected schedule data to be converted to converted data suitable for the second application, transfer the converted data to the specific application and cause the specific application to be presented on a display to the user, upon determination by the determining part of the second application as the specific application.

12. The management apparatus as claimed in claim 11, wherein if the current date-and-time is before the date-and-time of the selected schedule item, the application switching part automatically cause the first application to allow the user to confirm the selected schedule item.

13. The management apparatus as claimed in claim 11, wherein the schedule maintaining part is further configured to populate a schedule with information obtained from the first application.

14. The management apparatus as claimed in claim 11, wherein said management apparatus includes a scheduler application and the schedule information includes information generated and maintained by said scheduler application for an itinerary of a trip.

15. The management apparatus as claimed in claim 14, if a current date when the user opens the itinerary maintained by the scheduler application is before a scheduled date-and-time of a selected itinerary item, said first application activates a third application to enable the user to confirm or edit the selected itinerary item.

16. The management apparatus as claimed in claim 14, wherein if a current date-and-time when an itinerary item is selected or when the user opens the itinerary maintained by the scheduler application is within a predetermined time period before the date-and-time of the selected itinerary item, said scheduler application activates another application to enable check-in by the user in connection with the selected itinerary item.

17. The management apparatus as claimed in claim 14, wherein said second application is an expense reporting application configured to output an expense report in connection with the trip, and wherein the application switching part includes a data conversion part configured to convert one or more itinerary items into a corresponding expense report item for the expense reporting application.

18. The management apparatus as claimed in claim 17, wherein the application switching part includes a receipt identification part configured to cause a barcode coversheet to be output bearing a barcode encoding a ticket number assigned to the expense report, and cause an expense record image to include the barcode coversheet and one or more expense receipts.

19. The management apparatus as claimed in claim 18, further comprising an authentication part configured to maintain authentication information for each user for each of the scheduler application and the expense reporting application, wherein when the application switching part switches to the specific application, the authentication part supplies appropriate authentication information to login the user into the specific application.

20. A method for switching applications based on time information, said method comprising:
  (a) providing a first application configured to generate and maintain schedule data including time information, and a second application configured to perform a specific process by utilizing schedule information;
  (b) receiving user selection of a schedule item in the first application and comparing a current date at which the schedule item is selected to a date indicated by the time information of the selected schedule item;
  (c) automatically causing schedule data to be converted to corresponding data suitable for the second application, transferring the converted data to the second application and causing the second application to be displayed with the converted data, if the comparison in (b) indicates that the current date at which the schedule item is selected is after the date of the selected schedule item.

\* \* \* \* \*